(12) United States Patent
Dobson et al.

(10) Patent No.: US 8,240,194 B2
(45) Date of Patent: Aug. 14, 2012

(54) METHODS AND SYSTEMS FOR DIAGNOSTICS OF AN EMISSION SYSTEM WITH MORE THAN ONE SCR REGION

(75) Inventors: Douglas Allen Dobson, Ypsilanti, MI (US); Giovanni Cavataio, Dearborn, MI (US); Ed Badillo, Flat Rock, MI (US); Christine Kay Lambert, Dearborn, MI (US); Gang Guo, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 411 days.

(21) Appl. No.: 12/512,640

(22) Filed: Jul. 30, 2009

(65) Prior Publication Data

US 2011/0023591 A1     Feb. 3, 2011

(51) Int. Cl.
*G01M 15/10* (2006.01)
(52) U.S. Cl. .................................. 73/114.75
(58) Field of Classification Search ............. 73/114.69, 73/114.75
See application file for complete search history.

(56) References Cited

U.S. PATENT DOCUMENTS

| | | | |
|---|---|---|---|
| 5,260,035 A | 11/1993 | Lachman et al. |
| 6,125,629 A | 10/2000 | Patchett |
| 6,401,455 B1 | 6/2002 | Mathes et al. |
| 6,713,031 B2 | 3/2004 | Harris et al. |
| 6,755,014 B2 | 6/2004 | Kawai et al. |
| 6,763,657 B2 | 7/2004 | Wachi et al. |
| 6,823,660 B2 * | 11/2004 | Minami ........................... 60/280 |
| 6,826,902 B2 | 12/2004 | Sun et al. |
| 6,882,929 B2 | 4/2005 | Liang et al. |
| 6,925,796 B2 | 8/2005 | Nieuwstadt et al. |
| 6,957,528 B1 | 10/2005 | Cho |
| 6,996,975 B2 | 2/2006 | Radhamohan et al. |
| 7,051,515 B2 | 5/2006 | Schnaibel et al. |
| 7,143,578 B2 | 12/2006 | Kakwani et al. |
| 7,181,905 B2 | 2/2007 | Surnilla et al. |
| 7,200,990 B2 | 4/2007 | Gabrielsson et al. |
| 7,213,395 B2 | 5/2007 | Hu et al. |
| 7,229,597 B2 | 6/2007 | Patchett et al. |

(Continued)

FOREIGN PATENT DOCUMENTS

JP     10-047054     2/1998

(Continued)

OTHER PUBLICATIONS

Dobson, Douglas Allen et al., "Methods and Systems for Control of an Emission System With More Than One SCR Region," U.S. Appl. No. 12/512,634, filed Jul. 30, 2009, 64 pages.

*Primary Examiner* — Eric S McCall
(74) *Attorney, Agent, or Firm* — Julia Voutyras; Alleman Hall McCoy Russell & Tuttle LLP

(57) ABSTRACT

Methods and systems for controlling and/or diagnosing an emission control system of a vehicle having a first SCR region upstream of a second SCR region are provided herein. One exemplary method includes, indicating degradation based on a first SCR region performance during a first condition; and indicating degradation based on a second SCR region performance during a second condition, the first condition different than the second condition. In this way, different levels of degradation among different SCR regions may be used to indicate emissions levels have increased above a threshold value, for example.

8 Claims, 12 Drawing Sheets

U.S. PATENT DOCUMENTS

| | | | |
|---|---|---|---|
| 7,263,433 B2 | 8/2007 | Surnilla et al. | |
| 7,264,785 B2 | 9/2007 | Blakeman et al. | |
| 7,284,368 B2 | 10/2007 | Surnilla et al. | |
| 7,313,911 B2 | 1/2008 | Pfeifer et al. | |
| 2005/0056004 A1 | 3/2005 | Kakwani et al. | |
| 2005/0284134 A1 | 12/2005 | Radhamohan et al. | |
| 2007/0000239 A1 | 1/2007 | Liu et al. | |
| 2007/0009398 A1 | 1/2007 | Duvinage et al. | |
| 2007/0010020 A1* | 1/2007 | Elfvik et al. | 436/37 |
| 2007/0056267 A1 | 3/2007 | Handler et al. | |
| 2007/0160508 A1 | 7/2007 | Doumeki et al. | |
| 2009/0049899 A1* | 2/2009 | Hjorsberg et al. | 73/114.75 |
| 2009/0272099 A1* | 11/2009 | Garimella et al. | 60/277 |
| 2010/0050758 A1* | 3/2010 | Wang et al. | 73/114.75 |
| 2010/0101221 A1* | 4/2010 | Charbonnel et al. | 60/301 |
| 2010/0199754 A1* | 8/2010 | Shibata et al. | 73/114.75 |
| 2010/0218487 A1* | 9/2010 | Wang et al. | 60/287 |
| 2012/0004825 A1* | 1/2012 | Koch et al. | 701/103 |

FOREIGN PATENT DOCUMENTS

| | | |
|---|---|---|
| JP | 2002-256855 | 9/2002 |
| JP | 2003-172192 | 6/2003 |
| JP | 2003-214154 | 7/2003 |
| JP | 2003-214159 | 7/2003 |
| JP | 2003-214228 | 7/2003 |
| JP | 2006-077675 | 3/2006 |
| JP | 2006-177366 | 7/2006 |
| JP | 2007-327394 | 12/2007 |
| JP | 2008-309043 | 12/2008 |

* cited by examiner

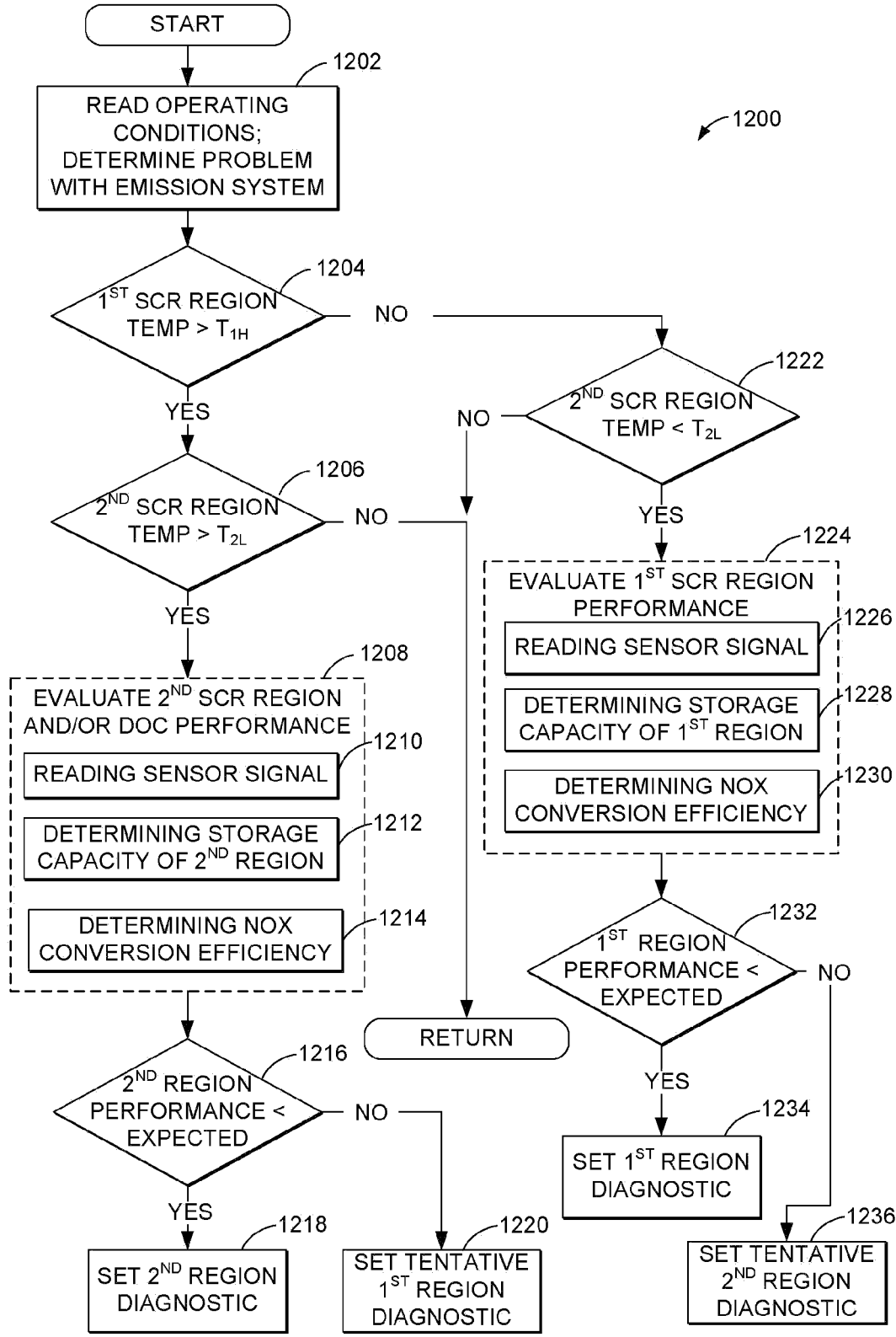
FIG. 16 - DIAGNOSTICS

METHODS AND SYSTEMS FOR DIAGNOSTICS OF AN EMISSION SYSTEM WITH MORE THAN ONE SCR REGION

FIELD

The present application relates to methods and systems for emission control of a vehicle with more than one selective catalytic reduction (SCR) region.

BACKGROUND AND SUMMARY

Selective catalytic reduction (SCR) systems may be used in a vehicle to facilitate reduction of engine output NOx by a reductant, such as urea or ammonia. An SCR system involves injecting the reductant upstream of an SCR catalyst where the reductant, or reductant products, can react with NOx to create byproducts such as nitrogen and water. An example NOx reduction system having a first and second catalyst bed in series is described in U.S. Patent Application US 2005/0284134A1 (Radhamohan et al)

During operation, SCR systems may experience various forms of degradation, such as contamination, thermal degradation, etc. However, in the example of multiple SCR regions, different levels of degradation of the different SCR regions may be trigger emission levels to rise above a threshold.

The inventors herein have recognized the above issues and developed various approaches in response. In one example, methods and systems for diagnosing a first SCR region and/or a second SCR region positioned in series are described. The method may comprise indicating degradation based on a first SCR region performance during a first condition; and indicating degradation based on a second SCR region performance during a second condition, the first condition different than the second condition.

For example, the method may differentiate the performance levels of the different SCR regions, and thus apply different threshold degradation levels to the different SCR regions. In this way, diagnostics can take into account the differing effects of degradation among the various SCR regions on the overall emission levels.

In one example, the first condition may include an engine cold start when a temperature of the first SCR region is below a high threshold and a temperature of the second SCR region is below a low threshold. Further, the second condition may include a DPF regeneration when the temperature of the first SCR region is above the high threshold and the temperature of the second SCR region is above the low threshold. By performing diagnostics when a temperature of one of the SCR regions is within a particular range, the performance of the remaining SCR region(s) can be evaluated while maintaining NOx conversion efficiency and reductant slip risk in reasonable ranges, and further isolating measurable performance to one or more particular regions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 16 is a flowchart illustrating an example method for diagnosing a first and/or second SCR region of an emission control system.

DETAILED DESCRIPTION OF THE DRAWINGS

Figure 1:
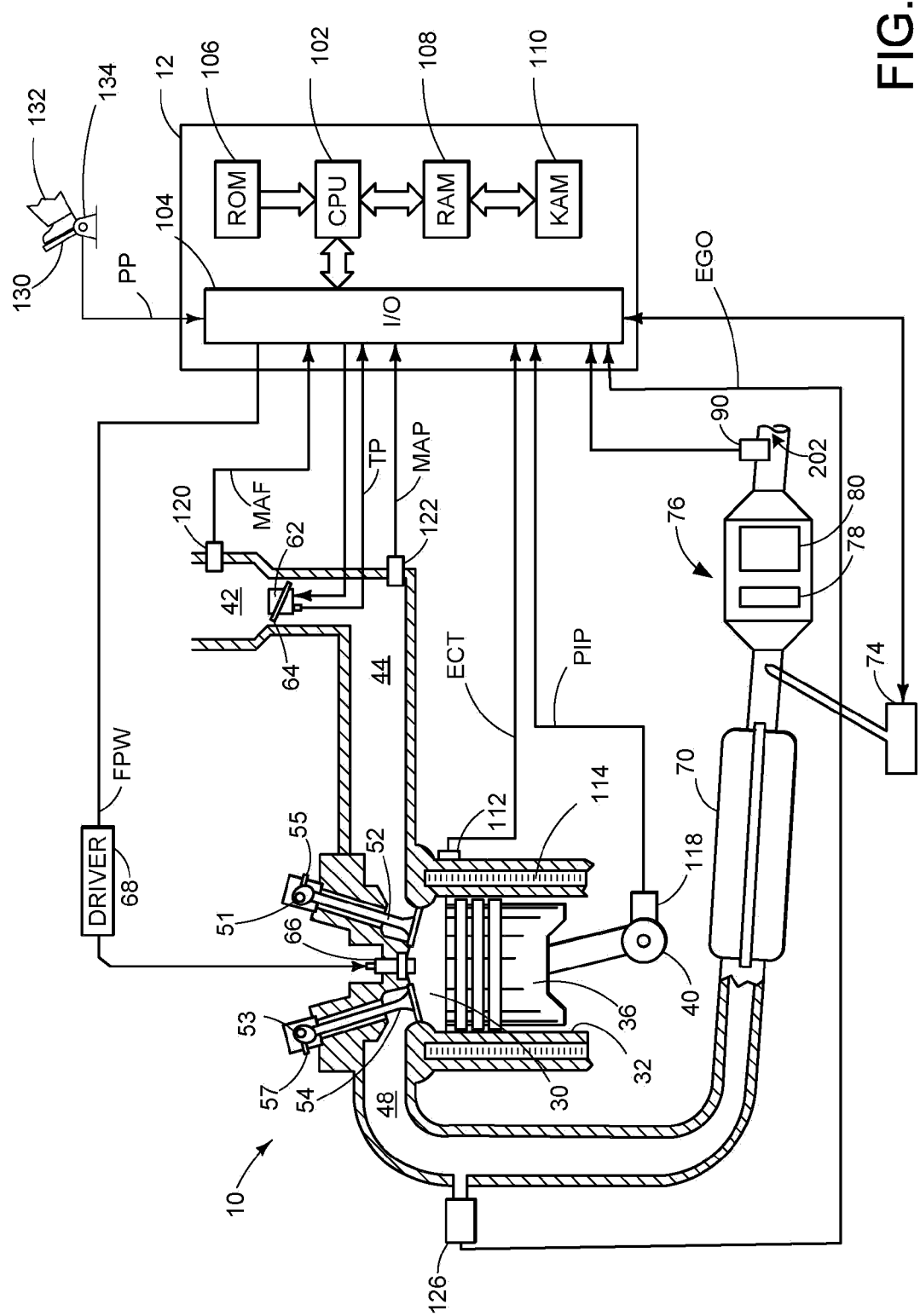
FIG. 1 is a schematic view of a cylinder of an engine and an emission control system as described herein.

Various SCR emission control system configurations are provided directed to balancing high NOx conversion efficiency while reducing reductant slip. An SCR emission control system may include more than one SCR region in series (such as a first and second SCR region), with reductant delivery upstream of each of the SCR regions. The reductant delivery may be a reductant injector, or a reductant generation devices, such as a lean NOx trap operating with rich exhaust gas.

Each of the SCR regions may comprise a catalyst bed within an SCR catalyst, a region within an SCR catalyst, and/or an SCR catalyst itself. By including more than one SCR region in series, a risk of reductant slip from a first SCR region during periods of high reductant injection may be reduced, as slipped reductant may be caught and stored at the second SCR region instead of being emitted through an exhaust tailpipe.

In order to control an SCR region's capacity for converting NOx, SCR regions may be selectively designed to hold a predetermined amount of washcoat per unit area or volume. For example, a first SCR region (e.g., most upstream) may be designed to have a smaller volume and a greater washcoat density than a second SCR region. Such a first SCR region may be a "light-off" catalyst, such that it may be able to quickly achieve high levels of NOx conversion (e.g., during engine warm-up). In another example, a washcoat loading of a first SCR region may be limited, and thus an amount of reductant storage may be limited. In such a case, an oxidation catalyst may be positioned downstream of a first SCR region to capture and convert a portion of slipped reductant to NOx, which can be subsequently delivered to the second SCR region downstream of the oxidation catalyst.

Accordingly, several approaches for operating the emission control systems having more than one SCR region in series are also provided herein. In some examples, the approaches include monitoring conditions of the SCR regions, and then operating based on said conditions. To control NOx conversion efficiency and reductant slip risk, an amount of injected reductant can be adjusted, and temperatures of the SCR regions can also be adjusted.

As one exemplary approach, a storage capacity of each SCR region may be monitored, and an amount of reductant stored at each SCR region may also be monitored. Based on these conditions, the emission control system can select an appropriate operating mode. For example, if all of the SCR regions have acceptable storage capacity, the system may operate an upstream SCR region at a very high NOx conversion efficiency while maintaining an acceptable amount of reductant stored at a downstream SCR region. In another example, where all of the SCR regions have acceptable storage capacity, the system may balance an amount of reductant stored at among the SCR regions. In yet another example, if one or more of the SCR regions has unacceptable, or negligible, storage capacity, the system may adjust an amount of reductant stored at other SCR region(s). Of course, various other modes of operation may also be used, such as described herein.

It may be appreciated that the present disclosure further includes approaches for diagnosing an emission control system having several SCR. Such approaches may vary between particular system configurations, and they may also vary within a particular system configuration, based on an emission control strategy/mode being implemented. For example, if an emission control system is designed with a NOx sensor or reductant sensor downstream of an SCR region that is furthest downstream, the emission control system may perform diagnostics when at least one of the SCR regions is inoperable, such as when storage capacity is unacceptable, or negligible, in order to isolate performance of other regions. Of course, several sensors may also be provided for performing diagnostics. Further details of such diagnostics under such conditions are described herein.

Referring now to FIG. 1, an environment for operation of an emission control system is shown. Namely, a schematic diagram showing one cylinder of a multi-cylinder engine 10, and an emission control system as described herein, is illustrated and described in detail.

Engine 10 may be controlled at least partially by a control system including an electronic controller 12 and by input from a vehicle operator 132 via an input device 130. In this example, input device 130 includes an accelerator pedal and a pedal position sensor 134 for generating a proportional pedal position signal PP. Combustion chamber 30 (e.g., cylinder) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable fuelling valve timing (VVT) and/or variable fuelling valve lift (VVL) systems that may be operated by electronic controller 12 to vary fuelling valve operation. The position of intake valve 52 and exhaust valve 54 may be determined by position sensors 55 and 57, respectively. In alternative embodiments, intake valve 52 and/or exhaust valve 54 may be controlled by electric fuelling valve actuation. For example, combustion chamber 30 may alternatively include an intake valve controlled via electric fuelling valve actuation and an exhaust valve controlled via cam actuation including CPS and/or VCT systems.

A fuel injector 66 is shown in a configuration that provides what is known as direct injection of fuel into the combustion chamber 30. Fuel injector 66 may inject fuel in proportion to the pulse width of signal FPW received from electronic controller 12 via electronic driver 68. Fuel may be delivered to fuel injector 66 by a fuel system (not shown) including a storage tank, a fuel pump, and a fuel rail.

Intake passage 42 may include a throttle 62 having a throttle plate 64. In this particular example, the position of throttle plate 64 may be varied by electronic controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to electronic controller 12 by throttle position signal TP. Intake passage 42 may include a mass air flow sensor 120 and a manifold air pressure sensor 122 for providing respective signals MAF and MAP to electronic controller 12.

As described above, FIG. 1 shows only one cylinder of a multi-cylinder engine, and each cylinder may similarly include its own set of intake/exhaust valves, fuel injector, etc.

Electronic controller 12 is shown here as a microcomputer including microprocessor unit 102, input/output ports 104, an electronic storage medium for executable programs and calibration values shown as read-only memory 106 in this particular example, random access memory 108, keep alive memory 110, and a data bus. Storage medium read-only memory 106 can be programmed with computer readable data representing instructions executable by microprocessor unit 102 for performing the methods described herein as well as other variants that are anticipated but not specifically listed.

Electronic controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Manifold pressure signal MAP from a manifold pressure sensor may be used to provide an indication of vacuum, or pressure, in the intake manifold. Engine speed signal, RPM, may be generated by electronic controller 12 from signal PIP. In one example, the engine position sensor (Hall effect sensor 118) may produce a predetermined number of equally spaced pulses every revolution of the crankshaft from which engine speed (RPM) can be determined.

Turning now to an emission control system downstream of the combustion chamber 30, an exhaust gas sensor 126 is shown coupled to exhaust passage 48 upstream of an emission control device 70. Emission control device 70 may be an oxidation catalyst, NOx trap, diesel particulate filter (DPF), various other emission control devices, or combinations thereof. Emission control device 70 can include multiple catalyst bricks, in one example. In another example, multiple emission control devices, each with multiple bricks, can be used. Emission control device 70 is shown arranged along exhaust passage 48 downstream of exhaust gas sensor 126. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some embodiments, during operation of engine 10, emission control device 70 may be periodically reset by operating at least one cylinder of the engine within a particular air/fuel ratio or temperature.

The emission control system further includes a selective catalytic reduction (SCR) system 76 having two or more SCR regions, such as first SCR region 78 and second SCR region 80. A reductant injector 74 may inject reductant, such as urea or ammonia, upstream of the first SCR region 78, according to signals received from the electronic controller 12. Reductant injected by the reductant injector 74 may be sourced from a reductant storage unit (not shown).

A sensor 90 may be positioned downstream of the second SCR region 80 (or a last SCR region, where there are more than two SCR regions), and may be configured to measure NOx, ammonia, and/or other exhaust components, and to communicate the measurements to the electronic controller 12. Thereafter, exhaust gas may flow to remaining downstream components and/or an atmosphere via exhaust tailpipe 202.

The electronic controller 12 may receive signals from sensor 90, as well as send and receive signals from the reductant injector 74 according to a reductant injection strategy. Such a reductant injection strategy may be updated based on signals received from sensor 90, as will be described later. Also, ammonia may be detected in the exhaust tailpipe using an excitation method.

One approach for monitoring and controlling the emission control system includes employing one or more models of the emission control system or components thereof, at the electronic controller 12. As one example, a predictive or feed-forward ammonia storage model of a first SCR region 78 can be used with mapping tables to establish inputs and storage levels for the SCR regions. In this way, reductant slip from the first SCR region and/or second SCR region can be effectively controlled. The usage of reductant storage models also allows for storage of catalyst conditions at the electronic controller 12 upon start-up of the vehicle to thereby allow for improved cold-start or hot-start conditions.

Another reductant storage model for the SCR regions may model each SCR region as having multiple zones, such that control of the emission control system can be based on local conditions of radial and/or axial areas of the SCR regions. With predictive capabilities, the limits of reductant injection control can be improved. Through such multi-zone modeling (or through direct measurement, in some conditions), an SCR region may be treated as several linked zones with each having specific characteristics mapped based on local operating conditions. Also, an oxidation model for an oxidation catalyst in the emission control system may improve a predictive nature of storage models of the SCR regions.

Models of the emission control system or components thereof may be updated based on input received from one or more NOx sensors, reductant sensors, UEGO sensors, and/or temperature sensors positioned upstream and/or downstream of the first and/or second SCR regions. Feedback from sensors may also provide validation control for models, and/or may be used to make accurate adjustments to an emission control strategy in real-time. Further, feedback from sensors may be used to adjust modeling inputs to compensate for any deterioration of SCR region performance, and thus to maintain usefulness of the models over a lifetime of the emission control system.

As mentioned above, multiple configurations of an emission control system having two or more SCR regions in series may be used, and each of the configurations may offer specific features. However, by mechanically arranging the SCR regions as described herein, some passive control of reductant slip reduction and NOx conversion efficiency improvements may be achieved. As one specific example, reductant can be injected upstream of the first SCR region in amounts conducive to high NOx conversion efficiency at a first upstream SCR region, while excess reductant can be passively caught and stored at a second (or third, fourth, etc.) downstream SCR region.

As a first example configuration, the emission control system of FIG. 1 shows the SCR system 76 including a first SCR region 78 as a first catalyst bed and a second SCR region 80 as a second catalyst bed. The first SCR region 78 is substantially smaller in volume than the second SCR region to allow for rapid light-off. In one example, a total SCR volume (e.g., volume of first SCR region and second SCR region) may be 200% of the engine swept volume, and the first SCR region 78 may have a volume that is any fraction of the total SCR volume that provides sufficient storage for cold-start emission levels. The size of the second SCR region 80 may be designed to provide sufficient space for storage of reductant slipped from the first SCR region 78. As the size of the second SCR region 80 is increased, a greater overflow reservoir for ammonia slip from the first SCR region 78 can be provided, and a risk of ammonia slip can be further reduced.

Figure 2:
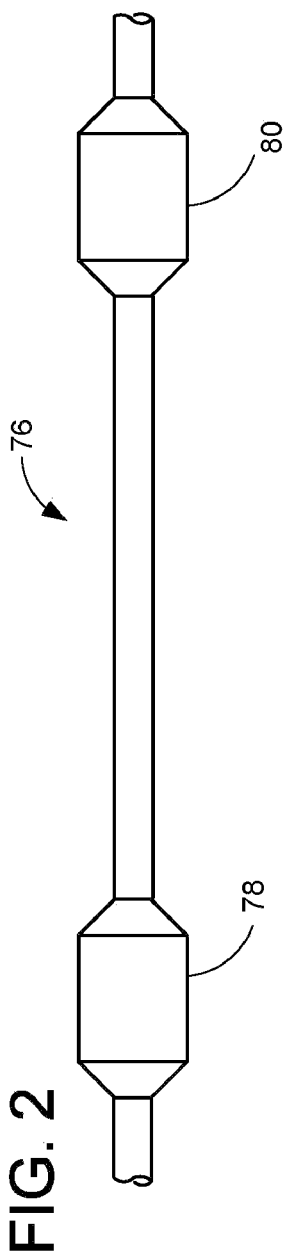
FIG. 2 is a schematic view of an exemplary SCR system having two SCR regions.

FIG. 2 shows an alternate configuration for the SCR system 76. Here, a first SCR region 78 is positioned downstream of a reductant injector (not shown) and is substantially separate from the second SCR region 80, which is positioned downstream of the first SCR region 78. That is, the first SCR region 78 may be considered a first SCR catalyst and a second SCR region 80 may be considered a second SCR catalyst.

The second SCR region 80 may be positioned substantially distant from the first SCR region 78 such that effects of exhaust gas temperature on the second SCR region 80 are reduced and/or delayed compared to the effects of exhaust gas temperature on the first SCR region 78. Thus, during engine operation, if a first SCR region's temperature increases and the reductant storage capacity of the first SCR region accordingly decreases, at least the temperature of the second SCR region 80 can be kept lower than the first SCR region 78, so that a predetermined amount of reductant storage at the second SCR region 80 can be maintained. Thus, high NOx conversion efficiency of unconverted NOx passed through from the first SCR region 78 can be achieved at the second SCR region 80. In another example, the second SCR region may be coupled to a cooler to maintain a lower temperature than the first SCR region.

Figure 3:
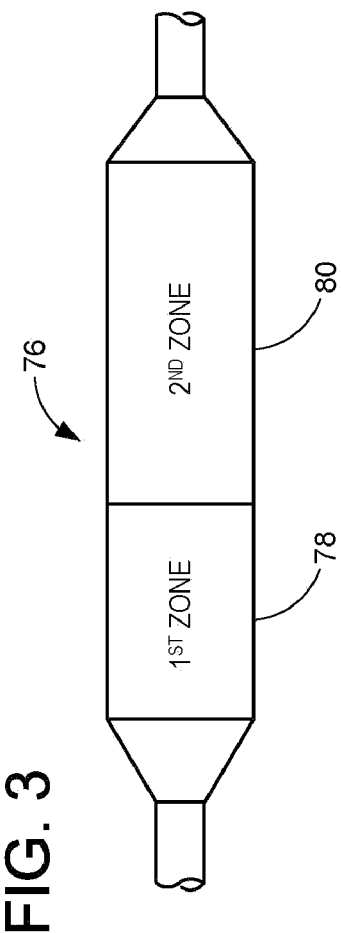
FIG. 3 is an exemplary schematic view of another embodiment of an SCR system having two zones.

FIG. 3 shows another configuration of an SCR system 76. Here, the first SCR region 78 is shown as a first zone of an SCR catalyst and the second SCR region 80 is a second zone of the SCR catalyst. In this example, the first zone and the second zone are positioned adjacent to one another such that together, they form an integral SCR catalyst. This configuration is advantageous for reducing space and cost.

Figure 4:
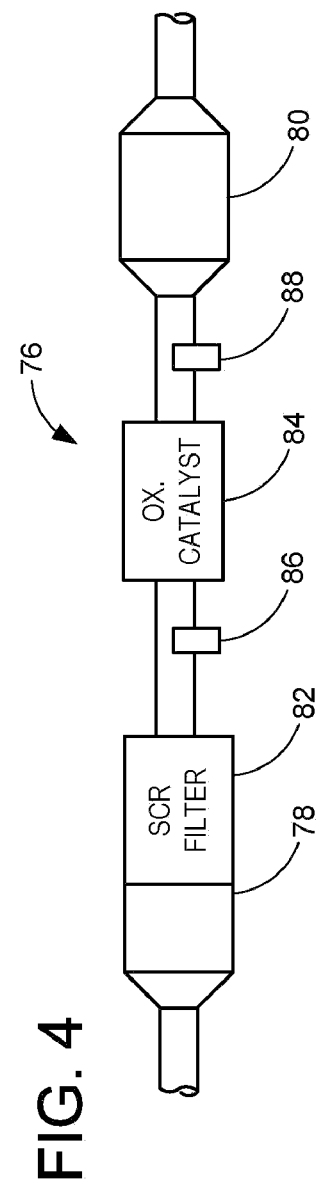
FIG. 4 is an exemplary schematic view of another embodiment of an SCR system having two SCR regions and an oxidation catalyst.

Further still, FIG. 4 shows another configuration. The first SCR region 78 is positioned downstream of a reductant injector (not shown), and an SCR filter 82 is positioned downstream of the first SCR region 78. The first SCR region 78 may be integrated with the SCR filter 82. The second SCR region 80 is positioned downstream of the first SCR region 78 and the SCR filter 82, and an oxidation catalyst 84 is positioned between the SCR filter 82 and the second SCR region 80. With this configuration, one or more sensors (e.g., NOx, NH3, UEGO, etc.) may be located upstream and/or downstream of the oxidation catalyst 84 so that reductant (e.g., ammonia) slip may be detected and so that conversion levels of the oxidation catalyst 84 can be detected. A first reductant sensor 86 and a second reductant sensor 88 may be positioned as shown.

The oxidation catalyst 84 is provided in order to receive slipped reductant from the first SCR region 78 and oxidize at least a portion of the slipped reductant. In this way, reductant (e.g., ammonia) can be converted to NOx for subsequent delivery to the second SCR region 80, to avoid exceeding a reductant storage capacity at the second SCR region 80. However, under some conditions, it may be desirable to oxidize only a portion of the slipped reductant at the oxidation catalyst 84, and purposefully pass a majority of the reductant slipped from the first SCR region 78 to the second SCR region 80. To achieve this, the oxidation catalyst 84 may be altered from a traditional oxidation or ammonia slip control function, to one that slips a majority of the ammonia from the first SCR region 78 or SCR filter 82 to the second SCR region 80.

Accordingly, the oxidation catalyst 84 may include materials which cause the reductant-to-NOx conversion to be an inefficient process (e.g., 40% reductant-to-NOx conversion). For example, the oxidation catalyst 84 may be thin, and may thus have relatively lower efficiency due to limited residence time for emissions to interact with a catalytic surface. Alternatively, or additionally, there may be holes drilled in the oxidation catalyst brick to create gas bypass regions, thereby reducing opportunity for exhaust bulk exchange with the catalyst washcoat. For example, the oxidation catalyst 84 may include a perforated material or may be designed so as to form and/or include a plurality of holes. In another example, the oxidation catalyst 84 may be formed with a low cell density, such as 50-200 cpsi, thereby limiting bulk transfer of reductant (e.g., ammonia) to the oxidation catalyst 84 for oxidation. Further still, the oxidation catalyst 84 may have an amount of platinum group metals below a predetermined threshold tuned for lower oxidation performance. In still another example, a selective coating process may be used where, rather than cutting sections from a brick, regions of a base substrate would not be treated or coated with washcoat to create the non-reactive void regions. This can be done by applying slurry charges to selective portions of the substrate and not fully coating. Various combinations of the oxidation catalyst designs and materials may be implemented.

Figure 5:
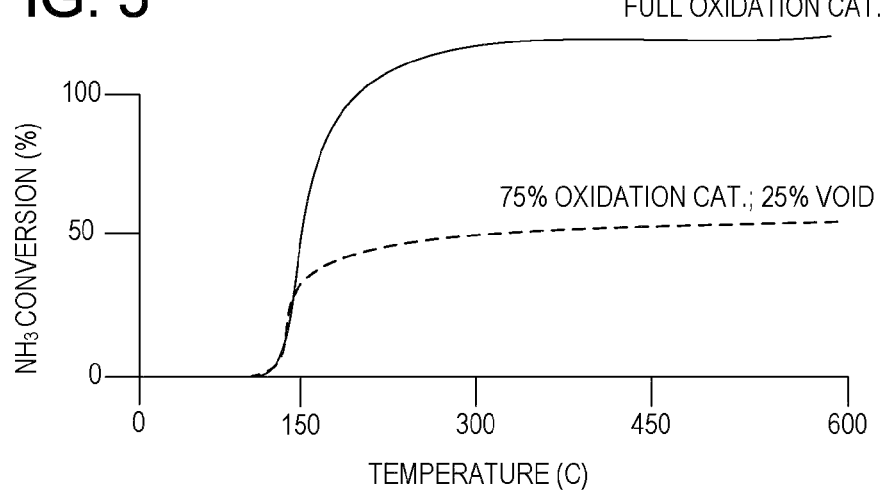
FIG. 5 is a graph showing efficiency of reductant conversion to NOx by two different oxidation catalysts.

As mentioned above, the oxidation catalyst may be designed so that a majority of the reductant slipped from the first SCR region 78 is passed to the second SCR region 80. FIG. 5 illustrates ammonia ($NH_3$) conversion to NOx by two different oxidation catalysts, as a function of temperature. For this exemplary graph, temperature was increased at a rate of 10 degrees Celsius per minute, with a 300 ppm ammonia feedgas. The solid curve illustrates that, once a full oxidation catalyst (e.g., standard diesel oxidation catalyst) has achieved light-off (e.g., 150-200 degrees Celsius), it almost completely converts ammonia to NOx. In this example, the amount of ammonia conversion is expressed as a percentage of the amount of ammonia detected by, for example, reductant sensor 86 of FIG. 4 to an amount of reductant detected by the reductant sensor 88 of FIG. 4, in one example. In contrast, the dashed curve illustrates that once an oxidation catalyst with 75% of its surface available for oxidation has achieved light-off, it converts approximately 50% of the ammonia that it receives. Thus, if it is desired to pass a majority of the reductant that is received at the oxidation catalyst 84 to the second SCR region 80, the oxidation catalyst with 75% of its surface available for oxidation may be included in the SCR system 76. An amount of an available catalytic surface may be selected for based on a desired amount of ammonia conversion at the oxidation catalyst, and any conversion percentage is possible.

Figure 6:
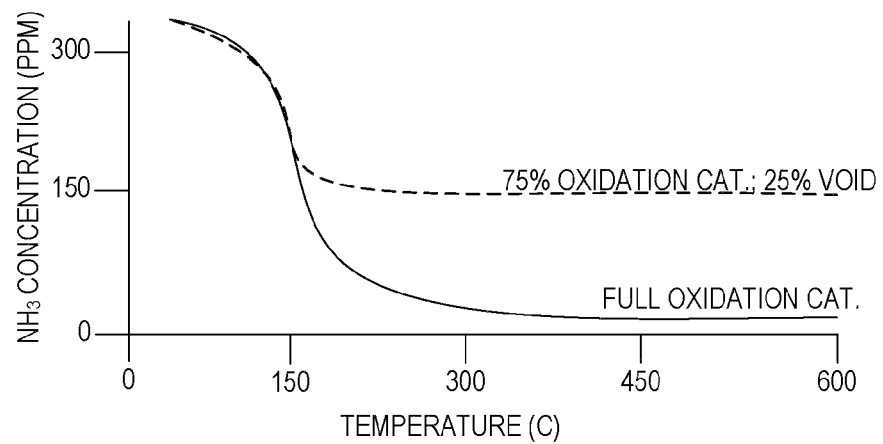
FIG. 6 is a graph showing a reductant concentration downstream of two different oxidation catalysts.

Further, FIG. 6 illustrates an amount of ammonia ($NH_3$) slip downstream of the diesel oxidation catalyst 84 under the same conditions as those of FIG. 6. A full oxidation catalyst slips only a small amount of ammonia once it has reached a steady operating state (e.g., 300 degrees Celsius). However, an oxidation catalyst with 75% of its catalytic surface available for oxidation may slip approximately half of the ammonia that the oxidation catalyst is fed, once it has reached a steady operating state, which is consistent with the amount of ammonia conversion illustrated in FIG. 5.

It may be appreciated that an oxidation catalyst may include one or more of an ammonia oxidation catalyst, a lean NOx trap, a diesel oxidation catalyst and/or a NOx adsorption catalyst. As will be discussed later, oxidation catalyst performance feedback to an electronic controller and/or to a reductant injector may be used to control reductant injection.

Turning now to the issue of NOx conversion at each of the SCR regions of the SCR system configurations presented, in one example a first SCR region is operated to convert a relatively higher portion of engine output NOx, as compared to a second (or third) SCR region. One way to achieve this is to have a highly loaded washcoat at the first SCR region so that an amount of NOx converted at the first SCR region can be increased. In order to achieve a high loaded washcoat and still be able to achieve rapid light-off (e.g., before light-off of the second SCR region 80), a first SCR region may have a smaller volume than a second SCR region (as shown in FIG. 1).

Accordingly, a first SCR region may have a first surface area-volume ratio that is greater than a second surface area-volume ratio of a second SCR region. In other words, a first washcoat density of the SCR region may be greater than a second washcoat density of the second SCR region. In one example, a first SCR region may have a coating level that is in excess of the standard loading level by at least 10% and the coating level may be as high as the injection limit allows for rapid saturation of reductant (e.g., ammonia, urea). In this way, even if a first SCR region is small in volume, the first SCR region can be quickly saturated with reductant injected during an engine cold start, and light-off of the first SCR region can be rapidly achieved due to low thermal inertia.

Figure 7:
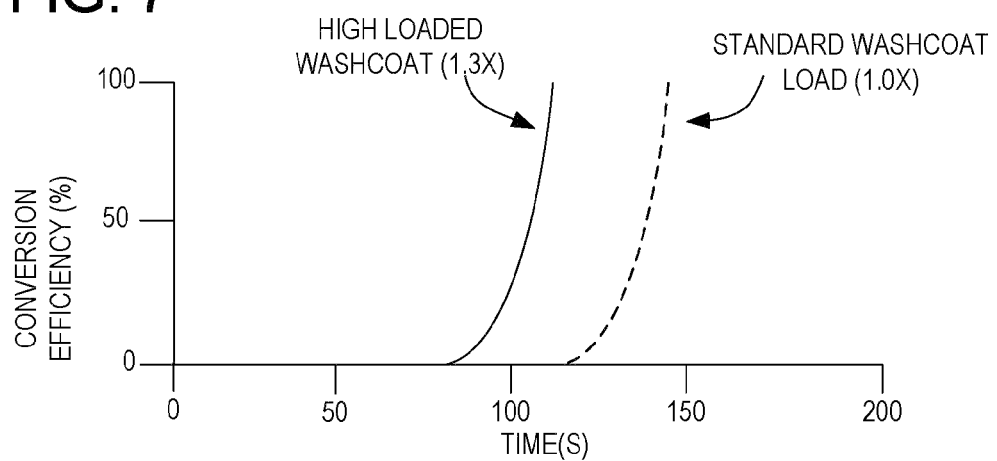
FIG. 7 is a graph showing NOx conversion efficiency over time by two SCR regions having different washcoat loadings.

As shown in FIG. 7, by increasing a loading of the washcoat of a first SCR region by ~30%, the time to achieve light-off operation of a saturated SCR region can be reduced. That is, the high loaded washcoat (solid curve, 1.3×) causes NOx removal to occur significantly sooner than NOx removal by the standard washcoat load (dashed curve, 1.0×).

To achieve a high washcoat density, several techniques may be employed. For example, a first SCR region may include high cell density materials for increasing the available surface area to apply washcoat. This may allow for more bulk-surface interface for increased exchange on performance. As another example, a first SCR region may have high porosity materials such that additional washcoat can be supported within the wall structure of the first SCR region. In this way, washcoat can be in the wall and on the surface to provide for maximum loading. As yet another example for increasing washcoat loading, a first SCR region may include thin-wall materials. An advantage of applying the SCR washcoat to a thin-wall material is to reduce the thermal inertia of the SCR component such that the washcoat material heats up and retains the heat sooner. Further, with respect to an extruded SCR having no substrate can be an additional option to create a high washcoat density SCR. It may be appreciated that various combinations, or none, of the designs and materials discussed for increasing washcoat loading may be implemented. A balance of these features can be tuned to maintain a desired full-life performance of the emission control system components.

In contrast, sometimes washcoat loading, or washcoat density, of an SCR region may be purposefully limited to avoid excessive back-pressure. In such a case, an emission control system with two or more SCR regions in series may still have a finite capacity for ammonia storage and thus carry a risk of slipping reductant from a second SCR region to the exhaust tailpipe. In this example, where pressure relief in the system is desired, the usage of an oxidation catalyst (see FIG. 4) may be advantageous because, as described above, a first SCR region can be saturated to achieve quick light-off and at least some of the slipped reductant from the first SCR region can be converted to NOx at the oxidation catalyst, thereby reducing a risk of reductant being slipped from the second SCR region.

Several emission control system configurations for passively reducing ammonia slip while improving NOx conversion efficiency have been presented. Each of these configurations may correspond with particular emission control strategies. That is, to further address reductant slip, several methods for actively preventing ammonia slip while improving NOx conversion efficiency are provided, and still various others may also be used.

Figure 8:
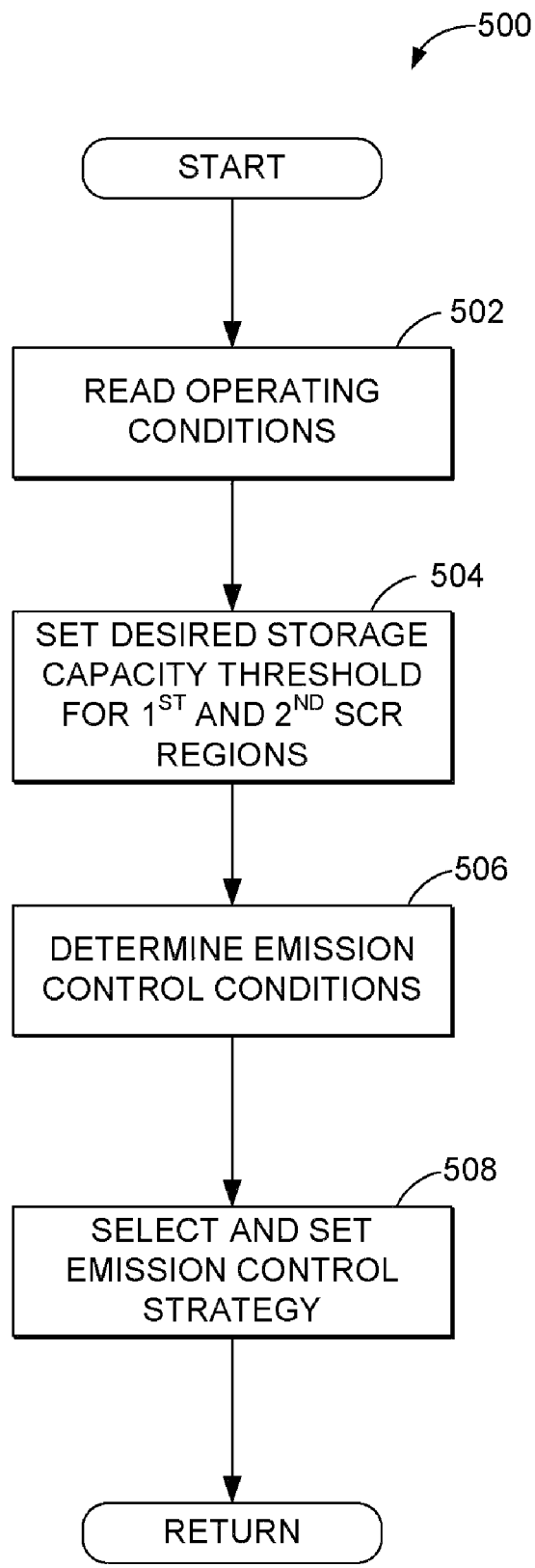
FIG. 8 is a flowchart illustrating a high-level example method for operating an emission control system.

Specifically, FIG. 8 illustrates an overview method 500 for selecting one of a plurality of emission control strategies based on SCR region conditions, such as storage capacity. The plurality of emission control strategies are presented at FIGS. 10-14. Specifically, a first emission control strategy may be selected and carried out if a first SCR region and a second SCR region are operating under steady state, warmed-up, conditions (e.g., both SCR regions have a desired storage capacity). A second emission control strategy may be selected and carried out if the first SCR region does not have the desired storage capacity (e.g., too low) but the second SCR region has a desired storage capacity, such as when a first SCR region is over-heated. Further, a third emission control strategy may be selected and carried out if the first SCR region has a desired storage capacity but the second SCR region does not have a desired storage capacity (e.g., too low), such as during engine warm-up. Further still, a fourth emission control strategy may be selected if both SCR regions do not have desired storage capacities, such as if one or more SCR regions are degrading, or degraded.

Turning now to FIG. 8, at 502, operating conditions are read. Operating conditions may include one or more of engine operating conditions, emission control system conditions, etc. At 504, a storage capacity threshold (e.g., a minimum desired storage capacity) is set for a first SCR region and for a second SCR region.

A storage capacity threshold may be determined based on an engine operating condition, such as whether the engine is starting up, idling, accelerating/decelerating, shutting down, etc. Different engine operating conditions may result in different engine output NOx levels, and so a storage capacity threshold for an SCR region may be set to accommodate a current engine output NOx level. For example, a greater storage capacity threshold may be set during engine warm-up, when there is high engine output NOx, compared to during engine idling. Furthermore, a storage capacity threshold may be determined based on a desired emission control strategy for the emission control system, and the desired emission control strategy may itself be based on a condition of the first and/or second SCR regions, as will be discussed. It may be appreciated that a storage capacity threshold may ultimately be limited by washcoat loading and/or washcoat density of an SCR region.

Figure 9:
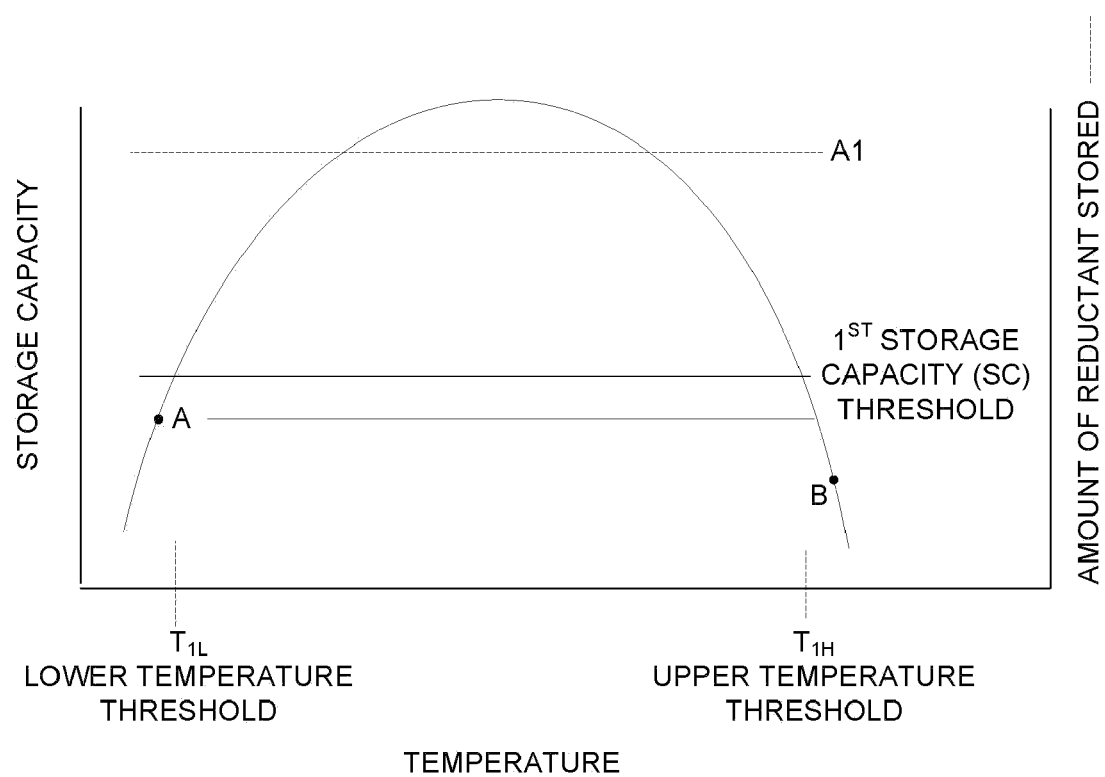
FIG. 9 is a schematic graph of storage capacity of an SCR region varying with a temperature of the SCR region.

Turning to FIG. 9, the graph shows how a storage capacity of an SCR region may vary with temperature. Thus, a storage capacity (SC) threshold for an SCR region may be set, at 504 of method 500, by setting a desired temperature range of the SCR region, such as between $T_{1L}$ (e.g., a lower temperature threshold) and $T_{1H}$ (e.g., an upper temperature threshold). The storage capacity threshold for SCR regions may be determined and set at the electronic controller based on pre-stored maps, such as the exemplary graph of FIG. 9, or based on one or more algorithms or models. Although FIG. 9 illustrates an exemplary curve of storage capacity by temperature for a first SCR region at FIG. 9, it may be appreciated that an exemplary relationship between storage capacity and temperature for a second SCR region may be similar or different from that shown in FIG. 9.

At 506, the method 500 may include determining emission control conditions. As one example, emission control conditions may include an actual storage capacity of each of the first and second SCR regions. Accordingly, the method 500 includes, at 508, selecting and/or setting an emission control strategy based on the emission control conditions determined at 506.

Figure 10:
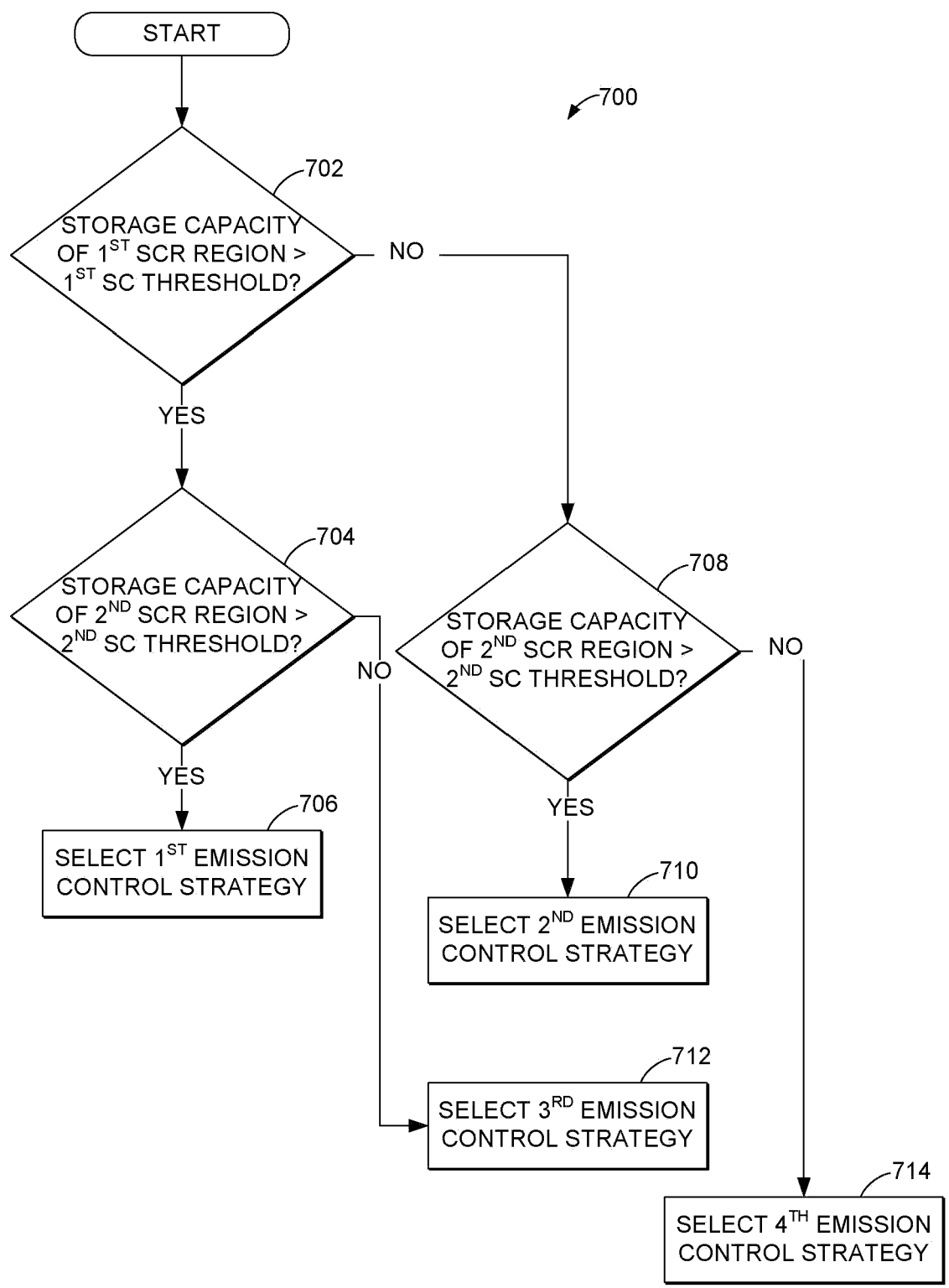
FIG. 10 is a flowchart illustrating an example method for selecting an emission control strategy.

Turning now to FIG. 10, steps 506 and 508 of method 500 are described in more detail. Specifically, FIG. 10 shows an exemplary method 700 for determining storage capacity conditions of a first and/or second SCR region and selecting an emission control strategy. In general, storage capacity conditions may be determined by a temperature of an SCR region, which may be associated with a particular storage capacity value or range of values, as was described with respect to FIG. 9.

At 702, the method 700 includes determining if the storage capacity of the first SCR region is greater than the first storage capacity threshold. Specifically, this may include determining if a temperature of the first SCR region is above a lower threshold temperature $T_{1L}$ and/or if the temperature of the first SCR region is below an upper threshold temperature $T_{1H}$.

If the answer is yes at 702, such that there is a desired amount of storage capacity in the first SCR region, the method 700 proceeds to 704, where it is determined if the storage capacity of the second SCR region is greater than a second storage capacity threshold. If the answer is yes at 704, such that there is a desired amount of storage capacity in the second SCR region, the method 700 proceeds to 706 where the first emission control strategy is selected. The first emission control strategy may be selected when both first and second SCR regions are warmed up and are capable of converting engine output NOx to nitrogen, water, and carbon dioxide in the presence of urea, for example. This may be considered a steady state of operation. As will be discussed below with respect to FIG. 11, the first emission control strategy may include controlling the first SCR region and/or the second SCR region to maintain a predetermined amount of stored reductant at each of the SCR regions (e.g., each SCR region may have a different predetermined amount, one higher than the other, or they be the same).

If the answer to 702 is no, such that the storage capacity of the first SCR region is less a desired amount, the method 700 proceeds to 708 where it is determined if the storage capacity of the second SCR region is greater than the second storage capacity threshold. If the answer is yes at 708, such that there is a desired amount of storage capacity at the second SCR region, the method 700 proceeds to 710 where a second emission control strategy is selected. Conditions for the selection of the second emission control strategy at 710 may transpire, for example, when an engine has been running for an amount of time so as to cause the first SCR region to be very hot (above an upper temperature threshold, for example), but the second SCR region is still sufficiently cool to convert NOx at an acceptable rate. As will be discussed in detail with respect to FIG. 12, the second emission control strategy may include controlling the second SCR region to maintain a predetermined amount of stored reductant at the second SCR region and/or to bring the storage capacity of the first SCR region above the first storage capacity threshold.

If the answer is no at 704, such that the storage capacity of the first SCR region is greater than the first storage capacity threshold (e.g., a desired storage capacity), but the second SCR region is not greater than the second storage capacity threshold (e.g., not a desired storage capacity), the method 700 proceeds to 712, where a third emission control strategy is selected. Conditions for selection of the third emission control strategy at 712 may transpire during an engine warm-up, for example, when the first SCR region has achieved light-off but the second SCR region has not yet achieved light-off. The third emission control strategy, discussed in detail with respect to FIG. 13, may include controlling the first SCR region to maintain a predetermined amount of stored reductant therein and/or increasing the storage capacity of the second SCR region to be above the second storage capacity threshold.

If the answer is no at 708, such that both the first and second SCR regions have a storage capacity that is less than a respective storage capacity threshold (e.g., not a desired storage capacity), the method 700 proceeds to 714, where a fourth emission control strategy is selected. The fourth emission control strategy may be selected at 714, for example, if both of the SCR regions are above a high temperature threshold, and thus are unable to convert NOx at an acceptable rate. The fourth emission control strategy may include efforts to increase one or more of the SCR regions' storage capacity to above a storage capacity threshold, as will be discussed in more detail with respect to FIG. 14.

Although components of method 700 are shown in one particular order, it may be appreciated that some or all of the actions may be included in the routine, and the actions may be carried out in any order.

The emission control strategies that will be described with respect to FIGS. 11-14 offer increased flexibility for an SCR system. Under some conditions, a reductant can be over-injected (with respect to a stoichiometric relation for near-complete NOx conversion) in order to saturate a first SCR region with reductant, thereby ensuring near-complete or complete NOx conversion efficiency. Under other conditions, reductant can be under-injected to reduce a risk of ammonia slip and/or to substantially deplete one or more SCR regions of stored reductant. At still other times, reductant can be injected at a level that is stoichiometric with respect to an amount needed to substantially completely convert NOx.

Figure 11:
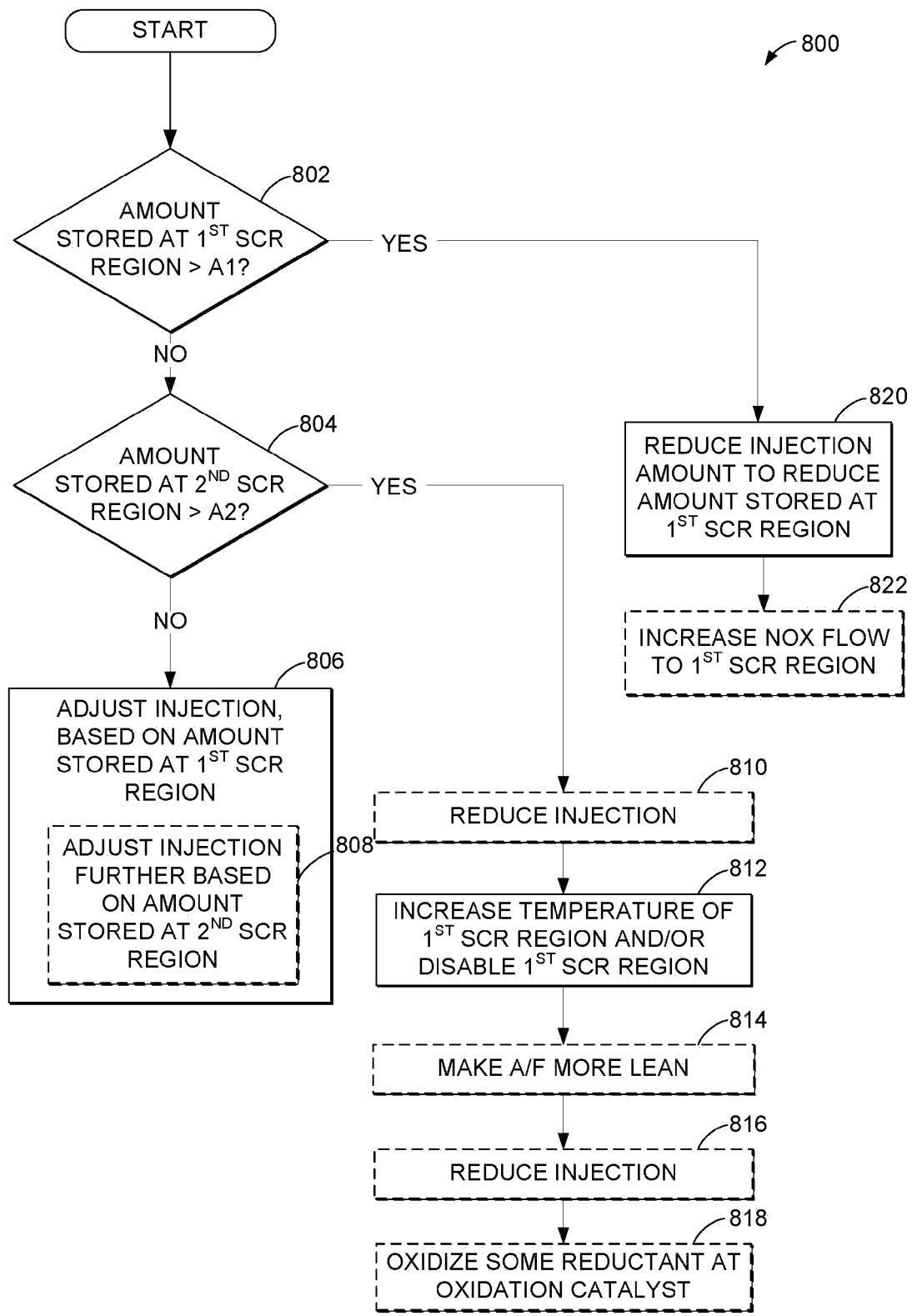
FIG. 11 is a flowchart illustrating an example method for operating in a first emission control strategy.

Referring now to FIG. 11, the first emission control strategy is illustrated. Method 800 may be carried out when the engine is operating in a steady state, for example. Specifically, as discussed with respect to FIG. 10, the method 800 may be carried out when the storage capacity of the first SCR region is above a first storage capacity threshold and the storage capacity of the second SCR region is above a second storage capacity threshold.

At 802, the method 800 includes determining if an amount of reductant stored at the first SCR region is greater than an upper threshold amount A1, which is schematically indicated on FIG. 9 by a dashed line. Such an upper threshold amount A1 may be set such that a "safety margin" exists above A1. By setting A1 to be lower than a maximum storage capacity, a situation where no more reductant can be stored and a risk of reductant slip is very high, can be avoided. In some examples, the amount of stored reductant may be calculated or predicted by a reductant storage model as described above. In this way, reductant slip from the first SCR region can be minimized. If the answer is no at 802, indicating that reductant stored at the first SCR region is below the upper threshold amount A1, the method 800 proceeds to 804.

Similarly, at 804, the method 800 includes determining if the amount of reductant stored at the second SCR region is greater than an upper threshold A2, which may be selected or determined in a manner similar to upper threshold A1. That is, upper threshold A2 may also be selected such that a "safety margin" exists above A2. If the answer is no at 804, the method 800 includes adjusting a reductant injection, or adjusting an amount of reductant injected upstream of a first SCR region based on a condition of the first SCR region, such as an amount of stored reductant at the first SCR region. In other examples, a condition of the first SCR region may include a storage capacity, a degradation, a volume, a density, etc. of the first SCR region.

The adjusting of 806 may be carried out to achieve a desired NOx conversion efficiency at the first SCR region. For example, during an engine start, the adjusting of 806 may include adjusting to inject an amount of reductant that is greater than a stoichiometric reductant-to-NOx ratio. That is, the first SCR region may be saturated with reductant such that very high NOx conversion efficiency (e.g., X %) can be achieved at the first SCR region during periods of high engine output NOx. In such a case of high reductant injection, at least some reductant (e.g. Y %) may slip from the first SCR region to the second SCR region, where it can be caught and stored for future use.

In some cases, the adjusting of 806 may include adjusting the injection, at 808, based on a condition of the second SCR region, such as an amount of reductant stored at the second SCR region. This may assist in maintaining an amount of reductant stored at the second SCR region at a desired level (e.g., below a second threshold amount). Further still, in general, when an oxidation catalyst is included in an emission control system, an amount of reductant injection may be further adjusted based on the performance of the oxidation catalyst.

It may be appreciated that the adjusting of 806 may be carried out, in some instances, when a storage capacity of the first SCR region is greater than a storage capacity of the second SCR region.

If the answer is yes at 804, indicating that an amount of stored reductant at the first SCR region is below an upper threshold amount A1, but that the amount of stored reductant at the second SCR region is equal to or greater than an upper threshold amount A2, actions may be carried out to reduce the amount of reductant stored at the second SCR region by increasing NOx flow to the second SCR region.

Specifically, at 810, the method 800 may include reducing a reductant injection by a reductant injector to thereby reduce the amount of stored reductant at the first SCR region to a predetermined low level. The method 800 may further include increasing a temperature of the first SCR region to reduce a capability of the first SCR region to convert NOx at 812. In this way, NOx flow to the second SCR region can be increased. The temperature may be increased at 812 in accordance with an amount of stored reductant at the second SCR region. In this way, the amount of NOx slipped to the second SCR region can be increased for consumption by reductant stored at the second SCR region.

In some cases, the method 800 may actually include, at 812, disabling the first SCR region (e.g., by increasing temperature of the first SCR region to a sufficiently high level) so that substantially all of the NOx (e.g., Z %) produced by the engine is passed to the second SCR region. The disabling at 812 may also be carried out by otherwise decreasing the amount of stored reductant at the first SCR region. By reducing the amount of reductant injected (such as at 810) before the increasing of the temperature of the first SCR region (such as at 812), a risk of reductant slip from the first SCR region to the second SCR region upon increasing of the temperature of the first SCR region at 812 can be reduced or eliminated.

At 814, the method 800 may include increasing NOx flow to the second SCR region by making the air-fuel ratio of the combustion chamber contents more lean. At 816, the method 800 may include further reducing an amount of reductant injected by a reductant injector. In this way, less NOx can be converted at the first SCR region, and this may effectively result in more NOx being passed to the second SCR region. By doing this, reductant stored at the second SCR region is used.

In the case of the emission control system including an oxidation catalyst positioned between the first SCR region and the second SCR region, the method 800 may include oxidizing some reductant at the oxidation catalyst, as shown at 818. Thus, NOx flow to the second SCR region can also be increased by oxidation of reductant at the oxidation catalyst. In some examples, the method 800 may include injecting an amount of reductant that is greater than a stoichiometric reductant-to-NOx ratio, to increase an amount of NOx generated by the oxidation catalyst.

If the answer to 802 is yes, and the amount of reductant stored at the first SCR region is equal to or greater than the upper threshold amount A1, actions to reduce the amount of reductant stored at the first SCR region may be carried out. Namely, at 820, an amount of injected reductant may be reduced. Furthermore, at 822, the method 800 may include increasing engine output NOx, and thereby increasing NOx flow to the first SCR region by, for example, operating the engine at a leaner air-fuel ratio. In another example, when the amount of reductant stored at the first SCR region is equal to or greater than the upper threshold amount A1, the amount of reductant stored at the second SCR region may be determined, and reductant injection, NOx flow, and/or temperature of the first and/or second SCR regions may be further adjusted based on the amount of reductant stored at the second SCR region.

In some emission control configurations, it may be desirable to include a reductant slip catalyst downstream of the second SCR region to allow the emission control system to operate with an amount of stored reductant near a maximum storage capacity of each respective SCR region. That is, the amount of reductant injected by the fuel injector would be sufficiently high to keep the washcoat of both of the first and second SCR regions saturated. In this case, if the emission control system includes an ammonia slip catalyst, and the answer is yes at 802, steps 820 and 822 may be skipped, and the system may be monitored for ammonia slip in the tailpipe. If an amount of ammonia slip in the tailpipe is above a predetermined threshold, an exhaust temperature, engine output NOx, reductant injection, and/or reductant storage capacity of the first and/or second SCR region can be adjusted to effectively purge any desired region of the emission control system.

Figure 12:
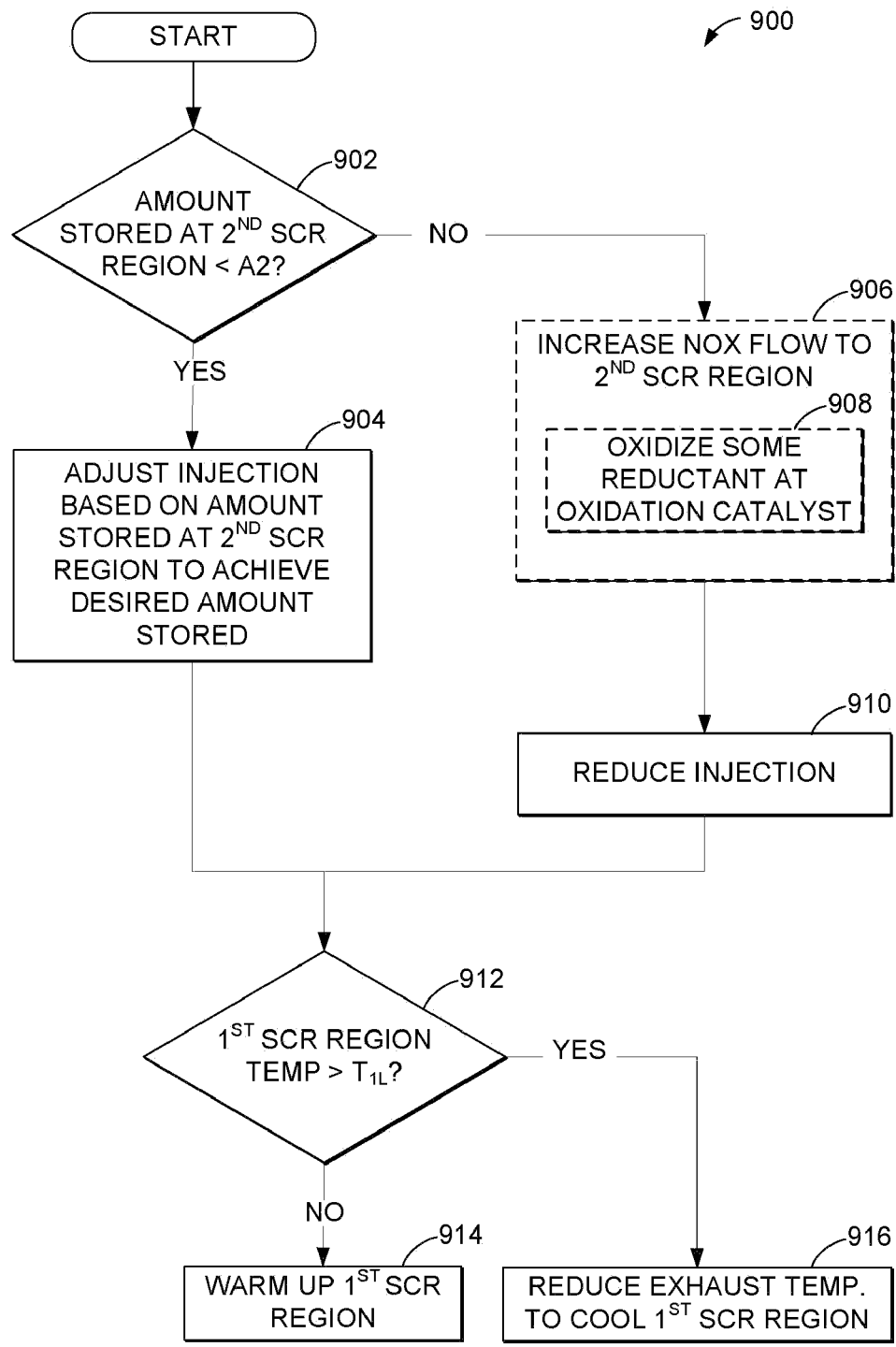
FIG. 12 is a flowchart illustrating an example method for operating in a second emission control strategy.

Turning to FIG. 12, the second emission control strategy is illustrated as an exemplary method 900. As discussed above, the second emission control strategy may be carried out when the storage capacity of the first SCR region is less than the first storage capacity threshold, (e.g., not a desired storage capacity), and the storage capacity of the second SCR region is above a second storage capacity threshold (e.g., a desired storage capacity), which may occur when the first SCR region is over-heated. In some cases, method 900 may be carried out when the storage capacity of the first SCR region is smaller than the storage capacity of the second SCR region, where the first and second SCR regions are positioned in separate emission control devices.

At 902, the method 900 includes determining if an amount of reductant stored at the second SCR region is less than the upper threshold amount A2. If so, the method proceeds to 904, including adjusting an amount of reductant injected upstream of the first SCR region based on a condition of the second SCR region, such as an amount of reductant stored at the second SCR region. In other examples, a condition of the second SCR region may include a storage capacity, a degradation, a volume, a density, etc. of the second SCR region.

However, if the amount of reductant stored at the second SCR region is equal to or greater than the upper threshold amount A2, the method 900 proceeds to 906, where engine output NOx is increased in an attempt to reduce the amount of stored reductant at the second SCR region. This may be achieved by, for example, causing one or more combustion chambers to operate more lean. If the emission control system includes an oxidation catalyst, the method 900 may include oxidizing some reductant at the oxidation catalyst at 908 to further increase NOx flow to the second SCR region. Further, the reductant injection may be increased so as to increase an amount of NOx produced by the oxidation catalyst. The method 900 may alternately include reducing the reductant injection at 910, if an oxidation catalyst is not a part of the emission control system.

The second emission control strategy presented as method 900 may also include efforts to increase the storage capacity of the first SCR region to above the first storage capacity threshold. This may be done for example, by controlling a temperature of the first SCR region, as storage capacity is largely affected by temperature. Therefore, it is determined at 912 if a temperature of the first SCR region is greater than a low temperature threshold $T_{1L}$. If the answer is no at 912, this may indicate the first SCR region is too cold, accounting for the low storage capacity. Thus, the method 900 proceeds to 914 where the first SCR region is warmed up by increasing the exhaust temperature in one example. If the answer is yes at 912, this may indicate the first SCR region is too hot, accounting for the low storage capacity. Accordingly, the method 900 proceeds to 916 where the exhaust temperature may be reduced in an attempt to cool the first SCR region. Controls may be in place so that that the exhaust temperature is not increased too much at 914 nor decreased too much at 916 so as to substantially and/or negatively affect operation of other emission control devices (e.g., oxidation catalyst, second SCR region, etc.). Other techniques for increasing or decreasing the temperature of the first SCR region may be employed, such as use of one or more heat exchangers.

Figure 13:
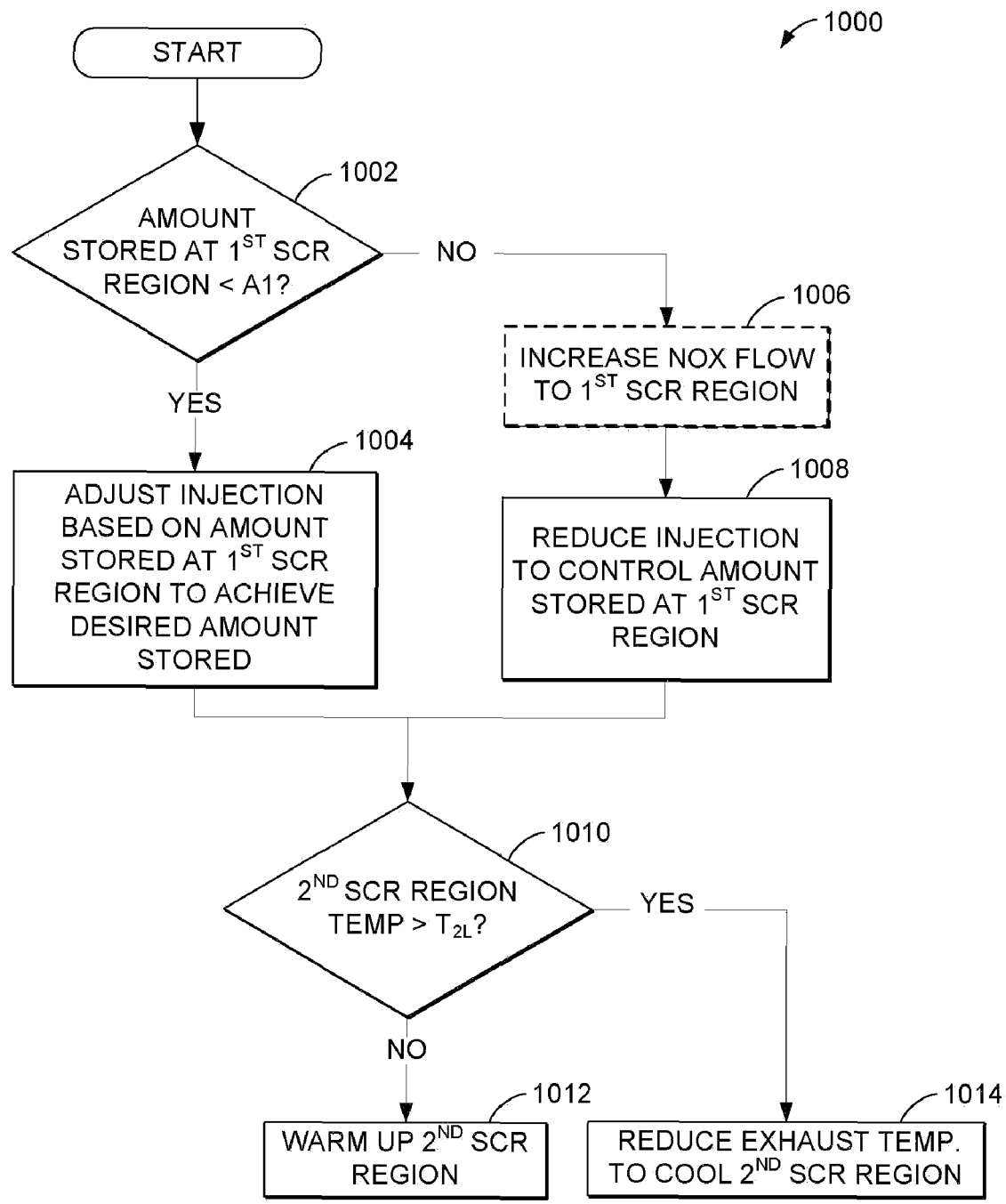
FIG. 13 is a flowchart illustrating an example method for operating in a third emission control strategy.

Referring now to FIG. 13, the third emission control strategy is illustrated as an exemplary method 1000. As discussed above, the third emission control strategy may be carried out when the storage capacity of the first SCR region is above a first storage capacity threshold (e.g., a desired storage capacity), and the storage capacity of the second SCR region is not above a second storage capacity threshold (e.g., not a desired storage capacity), such as when the engine is warming up so that the first SCR region has achieved light-off but the second SCR region has not yet achieved light-off. In some cases, method 1000 may be carried out when the storage capacity of the first SCR region is greater than the storage capacity of the second SCR region.

At 1002, the method 1000 includes determining if the amount of reductant stored at the first SCR region is less than the upper threshold amount A1, which is schematically indicated on FIG. 9. If the answer is yes at 1002, the method 1000 proceeds to 1004.

At 1004, the method 1000 includes adjusting an amount of reductant injected upstream of a first SCR region based on a condition of the first SCR region, such as an amount of stored reductant at the first SCR region. The adjusting of 1004 may be carried out to achieve a desired NOx conversion efficiency at the first SCR region. For example, during an engine start, the adjusting of 1004 may include adjusting to inject an amount of reductant that is a stoichiometric reductant-to-NOx ratio. Thus, near-complete NOx conversion efficiency (e.g., greater than 90%) can be achieved at the first SCR region during periods of high engine output NOx.

If the answer is no at 1002, indicating that an amount of stored reductant at the first SCR region is equal to or greater than an upper threshold amount A1, actions may be carried out to reduce the amount of reductant stored at the first SCR region by increasing NOx flow to the first SCR region, as shown at 1006. As discussed above, this may be achieved by operating the one or more of the combustion chambers of the engine at a leaner air-fuel ratio.

At 1008, the method 1000 may also include reducing a reductant injection by a reductant injector to thereby reduce the amount of stored reductant at the first SCR region to below the upper threshold amount A1.

The third emission control strategy presented as method 1000 may also include efforts to bring the second SCR region's storage capacity above the second storage capacity threshold. This may be done for example, by controlling a temperature of the second SCR region, as storage capacity of the second SCR region may be adjusted by controlling its temperature. Therefore, it is determined at 1010 if a temperature of the second SCR region is greater than a low temperature threshold for the second SCR region $T_{2L}$. If the answer is no at 1010, this may indicate the second SCR region is too cold, accounting for the low storage capacity. Thus, the method 1000 proceeds to 1012 where the second SCR region is warmed up, for example, by increasing the exhaust temperature.

If the answer is yes at 1010, it may be determined that the second SCR region may be too hot, since the storage capacity is low and the second SCR region is not too cold. Thus, the method proceeds to 1014 where the exhaust temperature may be reduced in an attempt to cool the second SCR region and thus increase the storage capacity.

Controls may be in place such that the exhaust temperature is not increased too much at 1012 nor decreased too much at 1014 so as to substantially and/or negatively affect operation of other emission control devices (e.g., oxidation catalyst, first SCR region, etc.). Other techniques for increasing or decreasing the temperature of the second SCR region may be employed, such as use of one or more heat exchangers.

Figure 14:
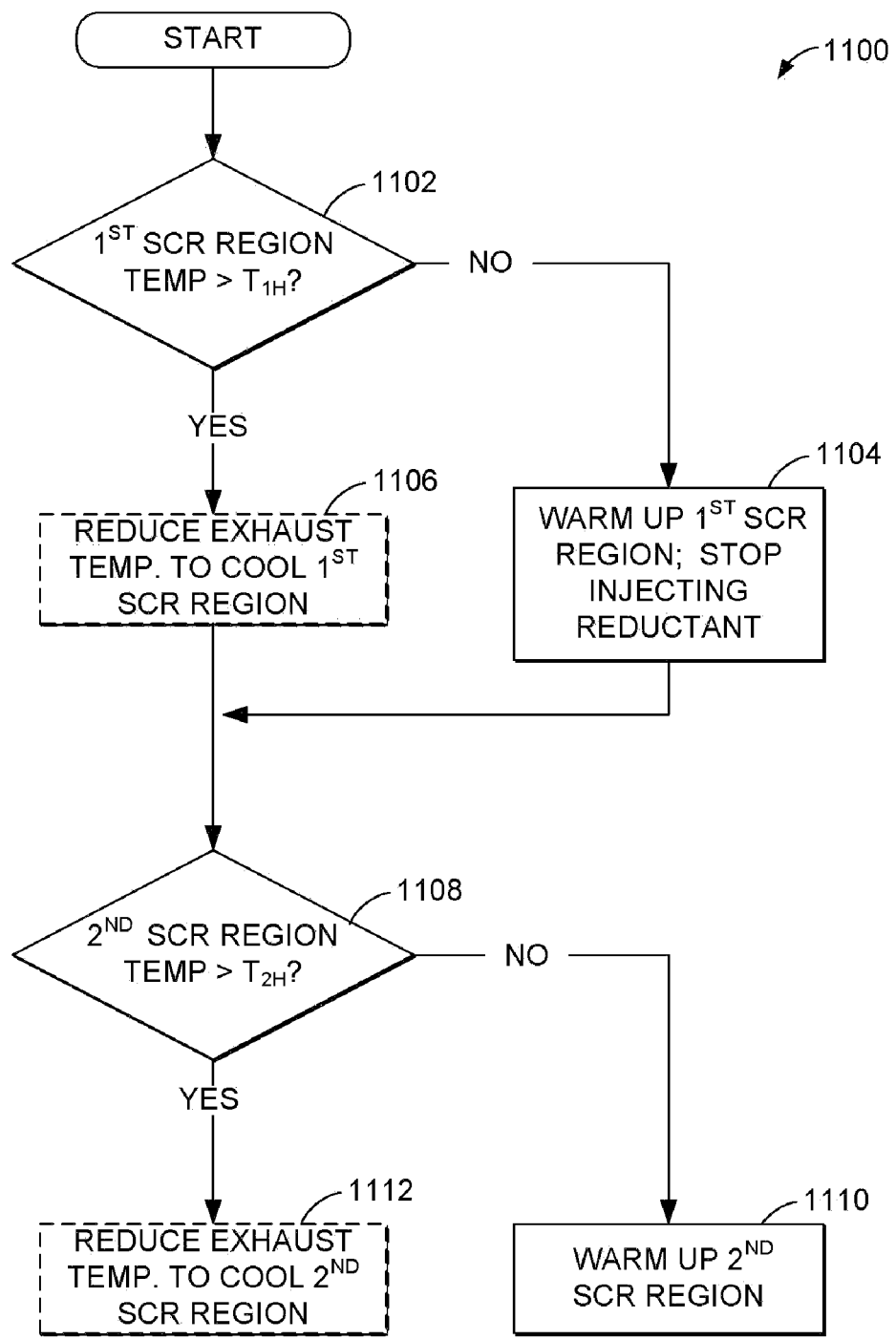
FIG. 14 is a flowchart illustrating an example method for operating in a fourth emission control strategy.

Referring now to FIG. 14, the method 1100 is the fourth emission control strategy, which may be carried out if the storage capacity of both the first and second SCR regions are less than respective storage capacity thresholds (e.g., not desired storage capacities), such as when at least one of the SCR regions is degraded. Here, a temperature of the first SCR region may be adjusted to be within a first desired range, and a temperature of the second SCR region may be adjusted to be within a second desired range.

Specifically, at 1102, it is determined if a temperature of the first SCR region is above an upper temperature threshold $T_{1H}$. If the answer is no at 1102, the first SCR region is not yet warmed up, such as at point A of FIG. 9. The method 1100 may proceed to 1104 where exhaust heat temperature is increased to thereby warm up the first SCR region. Some ways that exhaust heat temperature can be controlled may include adjusting an air-fuel ratio of combustion chamber contents, injection timing, throttling, etc.

Also, the method 1100 may include stopping the injecting of reductant at 1104. It may be desirable to stop the injecting since the storage capacity of both of the SCR regions is less than a desired amount, and a likelihood of reductant slipping to the atmosphere may be high.

If the answer is yes at 1102, the temperature of the first SCR region may be too high, such as at point B of FIG. 9. Thus, the method 1100 proceeds to 1106, where the exhaust heat temperature may be reduced in order to cool the first SCR region.

At 1108, the method 1100 may include determining if a temperature of the second SCR region is greater than an upper threshold $T_{2H}$. If the answer is no at 1108, this indicates the second SCR region may be too cold (e.g., point A of FIG. 9), so the method 1100 proceeds to 1110, where exhaust heat may be increased to warm up the second SCR region. If the answer is yes at 1108, the second SCR region may be too hot (e.g., point B of FIG. 9), so the method 1100 may proceed to 1112 where the exhaust temperature may be reduced in efforts to cool the second SCR region.

From the discussions of the emission control strategies presented in FIGS. 11-14, it may be appreciated that, under some conditions, an emission control system may be operated with a first amount of stored reductant at the first SCR region greater than a second amount of stored reductant at the second SCR region, such as during the third emission control strategy, during an engine cold start, or when a temperature of the second SCR region is below a lower threshold (e.g., too cold) or above an upper threshold (e.g., too hot), as just some examples.

In some cases, there may be more stored reductant at the first SCR region than the second SCR region by happenstance (e.g., as a result of normal engine operation). In other examples, operating parameters may be adjusted to achieve the first amount of stored reductant greater than the second amount of stored reductant. Said operating parameters may include one or more of a NOx flow, a temperature of the first SCR region, a temperature of the second SCR region, and an amount of reductant injected as just some examples. Thus, in order to achieve a greater amount of first stored reductant than second stored reductant, NOx flow to the first SCR region may be reduced, temperature of the first SCR region may be maintained in a predetermined range, and/or an amount of reductant injected may be increased.

On the other hand, an emission control system may be operated with the second amount of stored reductant greater than the first amount of stored reductant, such as when a temperature of the first SCR region is above an upper threshold (e.g., too hot), or when the first SCR region is disabled, or when performing a SCR filter (or diesel particulate filter) regeneration, as some examples. In some cases, there may be more stored reductant at the second SCR region than at the first SCR region simply as a result of engine operation, or happenstance. This may occur when vehicle acceleration and/or engine speed is above a predetermined threshold. For example, during hard acceleration and high speed driving, an efficiency of the first SCR region may be lower than 100% due to high temperature and high space velocity of the first SCR region. In this case, the second SCR region may be in a temperature window sufficient for unconverted NOx received from the first SCR region to be consumed by stored $NH_3$ at the second SCR region.

In other examples, operating parameters may be adjusted to cause the first amount of stored reductant to be less than the second amount of stored reductant. As discussed, said operating parameters may include one or more of a NOx flow, a temperature of the first SCR region, a temperature of the second SCR region, and an amount of reductant injected. In order to achieve a lesser amount of first stored reductant than second stored reductant, NOx flow to the first SCR region may be reduced compared to NOx flow at the second SCR region, temperature of the first SCR region may be increased above an upper threshold, and/or temperature of the second SCR region may be maintained in a predetermined range. Furthermore, an amount of reductant injected may be increased or decreased based on other conditions, in order to achieve a greater amount of reductant stored at the second SCR region compared to the first SCR region.

Figure 15:
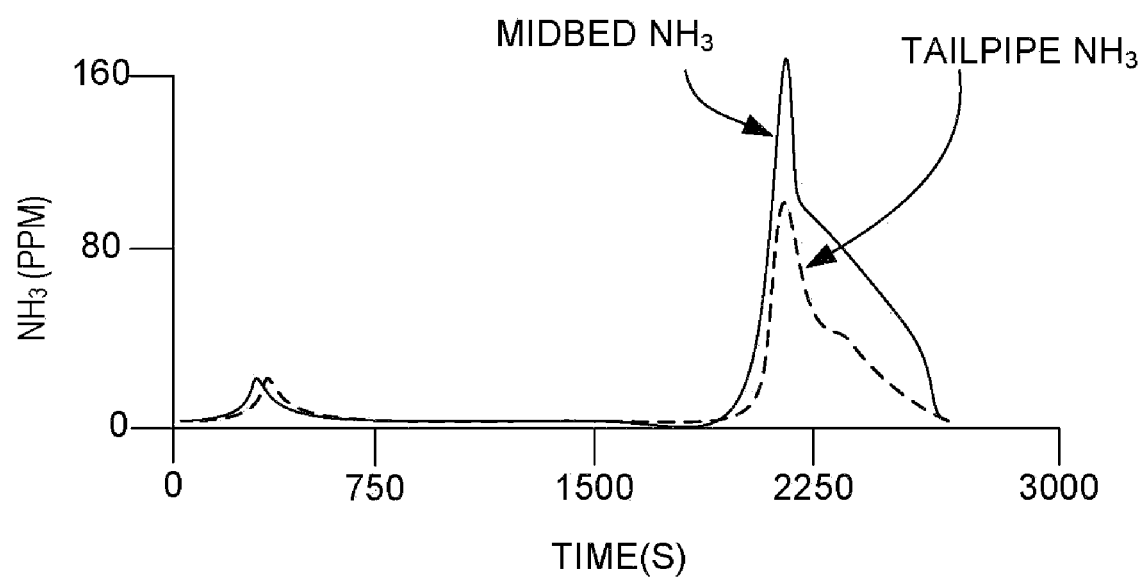
FIG. 15 is a schematic graph of reductant concentration at a midbed of an SCR system and at an exhaust tailpipe.

FIG. 15 shows, as a schematic graph, an amount of reductant at a midbed location (e.g., between the first SCR region and the second SCR region) and an amount of reductant at a tailpipe location (e.g., downstream of the second SCR region) during operation of an engine and an emission control system configured to use the emission control strategies described herein. It can be appreciated from this graph that the use of more than one SCR region in combination with the control strategies described herein substantially reduces reductant slip.

Specifically, FIG. 15 represents, prophetically, a "typical" field condition. The trace shows the ammonia release over a FTP 75 cycle. In this example, the first SCR region and the second SCR region have moderate-to-high pre-adsorbed levels of ammonia. The 0-505 second region is a bag 1 cold start—with some over-injection of NH3 to boost conversion with a small amount of slip. The larger ammonia spike is from bag 3 of the FTP—hot-start and the release from the first SCR is temperature driven and the second is due to pre-adsorbed ammonia limiting some of the adsorption. In contrast, in the condition of no pre-adsorbed ammonia, with the over-injection strategy described herein, there is a similar trace as the solid line, but the dashed line does not have any spikes over 20 ppm since the second SCR region is adjusted to have substantially no ammonia stored on it and can completely adsorb the spikes.

Turning now to the issue of diagnosing emission control system components in an emission control system having more than one SCR region in series, FIG. 16 illustrates a method 1200. The method 1200 includes reading operating conditions at 1202. Operating conditions may include engine operating conditions and/or a current emission control strategy, as some examples. At 1202, it is determined that there is a problem with the emission control system, and that the problem is not a problem of the reductant injector nor is it a problem of any of one or more sensors that may be sensing a condition of emission control system components. That is, emission control components other than the first SCR region and the second SCR region may have already been ruled out (or diagnosed) as candidate contributors to the emission control system problem.

As will be discussed in detail, diagnostics may be performed when one of the SCR regions is not converting NOx, is converting NOx at an unacceptably low rate (e.g., less than 50%), or at a known rate. Thus, diagnostics may be performed when a temperature of the first and/or second SCR region is too low or too high so as to be converting NOx. For example, if the first SCR region is outside of a NOx converting range, the second SCR region can be diagnosed. On the other hand, if the second SCR region is outside of a NOx converting range, the first SCR region can be diagnosed. An operating range may correspond to a temperature range and/or a storage capacity of an SCR region.

Although not shown, the method 1200 may include adjusting operating parameters to achieve a desired temperature of the first SCR region and/or a desired temperature of the second SCR region, where the operating parameters may include one or more of an engine speed, an engine load, an air-fuel ratio, and an amount of reductant injected. That is, the temperature of the first and/or second SCR region may be purposefully increased or decreased in order to place the system in a state conducive to performing SCR system diagnostics.

At 1204, the method 1200 includes determining if a temperature of the first SCR region is greater than an upper temperature threshold $T_{1H}$. If the answer is yes at 1204, this may indicate the first SCR region is disabled (e.g., unable to convert NOx). Thus, the method 1200 may proceed to 1206, and determine if a temperature of the second SCR region is above a lower threshold $T_{2L}$. The lower threshold $T_{2L}$ may be a temperature below which the second SCR region is unable to store reductant and/or unable to convert NOx. Thus, if the answer is yes at 1206 (e.g., the second SCR region is converting NOx), the method proceeds to 1208.

At 1208, the method 1200 includes evaluating the performance of the second SCR region. Since the first SCR region may be functionally disabled under these conditions, diagnostics of the second SCR region can be carried out under an assumption that a majority of the engine output NOx is flowing to the second SCR region without being converted at the first SCR region. This may occur, for example, during an SCR filter regeneration, when the first SCR region is being subjected to high temperatures. That is, during an SCR regeneration cycle, the temperature of the first SCR region may rise, and thus the reductant storage capacity decreases.

At 1210, the method 1200 includes reading a sensor signal from a NOx sensor downstream of a second SCR region, for example. At 1212, the method 1200 includes determining a storage capacity of the second SCR region. The method 1200 may also include determining a NOx conversion efficiency of the second SCR region at 1214. Various calculations and/or comparisons may be made to evaluate the performance of the second SCR region.

At 1216, if it is determined that the second SCR region's performance is less than an expected performance (e.g., the performance is not as good as expected), the method 1200 includes setting a diagnostic of the second SCR region at 1218. As one example, the setting of a diagnostic of the second SCR region may be carried out responsive to determining that a storage capacity of the second SCR region is less than an expected storage capacity of the second SCR region. That is, the method 1200 includes setting a diagnostic of the second SCR region based on a signal indicating a degradation of the second SCR region.

However, if the second SCR region's performance is at least equal to the expected performance (e.g., the performance is as good as expected), the performance of the second SCR region may not be the source of the emission control system problem. Thus, the method 1200 includes setting a tentative first SCR region diagnostic at 1220. That is, the method 1200 may include setting a diagnostic of the first SCR region based on a signal indicating there is not degradation of the second SCR region.

If the answer is no at 1206, such that the temperature of the first SCR region is above an upper threshold $T_{1H}$ (e.g., first SCR region is too hot), and the temperature of the second SCR region is below the lower threshold $T_{2L}$ (e.g., second SCR region is too cold), the method 1200 may end. That is, emission control system diagnostics may not be performed, in this example. However, it may be appreciated that, in a system with provisions for doing so (e.g., additional sensors), emission control system diagnostics may be carried out under such conditions.

If the answer is no at 1204, such that the temperature of the first SCR region is not above the upper threshold $T_{1H}$ (e.g., the first SCR region is converting NOx), the method 1200 proceeds to 1222. Here, it is determined if the second SCR region is below a lower threshold $T_{2L}$. If the answer is yes at 1222, such that the first SCR region is converting NOx but the second SCR region is not converting NOx, diagnostics of the first SCR region can be carried out under an assumption that the second SCR region is not substantially contributing to NOx conversion. These conditions may occur, for example, during at least a portion of an engine cold start, when the first, but not the second, SCR region is sufficiently warmed up.

At 1224, the method 1200 includes evaluating a performance of the first SCR region. This may include reading a sensor signal at 1226, determining the first SCR region's storage capacity at 1228, and/or determining NOx conversion efficiency by the first SCR region at 1230.

At 1232, the first SCR region's performance is compared against an expected performance. As one example, the performance of the first SCR region may be a storage capacity, based on the temperature of the first SCR region, and this may be compared against an expected storage capacity. In other examples, an amount of NOx downstream of the first SCR region may be compared to an expected amount of NOx, and/or a NOx conversion efficiency of the first SCR region may be compared against an expected NOx conversion efficiency.

In any case, if the first SCR region's performance is less than the expected performance (e.g., not converting NOx at an expected rate), the method 1200 includes setting a diagnostic of the first SCR region at 1234. That is, the method 1200 includes setting a diagnostic of the first SCR region based on a signal indicating a degradation of the first SCR region.

If the answer is no at 1232, the method 1200 includes setting a tentative second SCR region diagnostic at 1236. That is, the method 1200 may include setting a diagnostic of the second SCR region based on a signal indicating there is not degradation of the first SCR region.

If the answer is no at 1222, such that both of the first SCR region and the second SCR region are converting NOx at a substantially high rate, the emission control diagnostics may end.

As suggested above, additional, or supplementary, emission control diagnostic routines may be provided for performing diagnostics of the first and/or second SCR region when both of the regions are operable and converting NOx at a substantially high rate. Such a routine may rely on one or more sensors (e.g., NOx sensors) downstream of the first and/or second SCR regions. In this way, even when both SCR regions are within operable ranges, degradation of one or more of the SCR regions can be determined by comparing an amount of NOx conversion by each region (detected by a NOx sensor) to an expected NOx conversion efficiency. An expected conversion efficiency may be based on one or more of engine load, engine speed, storage capacity, amount of stored reductant, temperature, etc.

As discussed above, an oxidation catalyst may be positioned downstream of the first SCR region and upstream of the second SCR region, and thus may oxidize at least a portion of reductant slipped from the first SCR region. In such a case, the method 1200 may include provisions for determining if the oxidation catalyst is performing as expected. In some cases, the method 1200 may include setting an oxidation catalyst diagnostic based on an oxidation catalyst performance when the temperature of the first SCR region is above the upper threshold $T_{1H}$ at 1204 and the temperature of the second SCR region is above the lower threshold $T_{2L}$ at 1206. In such a case, substantially all of the engine output NOx may be received at the oxidation catalyst. Thus, an electronic controller may set an expected performance of the oxidation catalyst (e.g., how much NOx will be created) and an expected performance of the second SCR region (e.g., how much NOx will be converted), and compare an amount of tailpipe NOx to an expected amount of NOx. In yet other examples, an oxidation catalyst may be diagnosed if the answer to 1216 and/or 1232 is no.

The method 1200 is exemplary. As such, the determination at 1204 may be replaced with a determination of whether the temperature of the first SCR region is below a lower threshold that functionally disables the first SCR region, or it may be replaced with any other determination that the first SCR region is insubstantially contributing to NOx conversion. Similarly, the determination at 1222 may be replaced with a determination of whether the temperature of the second SCR is greater than an upper threshold that functionally disables the second SCR region, or it may be replaced with any other determination that the second SCR region is insubstantially contributing to NOx conversion. Further, the determination at 1206 may be replaced with a determination that the second SCR region is within an operating range, or that it is substantially contributing to NOx conversion.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types.

Further, while various portions are described with respect to controlling/adjusting reductant injection to adjust ammonia delivered to the various SCR regions, reductant generation in an upstream catalyst, such as an upstream lean NOx trap, e.g., via adjustment of a rich exhaust gas air-fuel ratio, may also be used in place of, or in addition to, the reductant injection. Thus, for each instance of adjusting reductant injection in a particular way, adjustment of air-fuel ratio in an upstream lean NOx trap may also be used in place thereof. As such, the subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for diagnosing a first SCR region and a second SCR region positioned in series, comprising:
    indicating catalyst degradation based on a first SCR region performance during an engine cold start when a temperature of the first SCR region is below a high threshold and a temperature of the second SCR region is below a low threshold; and
    indicating catalyst degradation based on a second SCR region performance during a second, different, condition.

2. The method of claim 1 wherein the second condition includes during a DPF regeneration when the temperature of the first SCR region is above the high threshold and the temperature of the second SCR region is above the low threshold.

3. The method of claim 2, further comprising indicating degradation of an oxidation catalyst based on an oxidation catalyst performance when the temperature of the first SCR region is above the high threshold and the temperature of the second SCR region is above the low threshold.

4. The method of claim 2, further comprising adjusting operating parameters to achieve the temperature of the first SCR region and the temperature of the second SCR region.

5. The method of claim 4, wherein the operating parameters include injection timing.

6. A method for diagnosing a first SCR region and a second SCR region positioned in series, the method comprising:
    indicating catalyst degradation based on a first SCR region performance during a first condition;
    indicating catalyst degradation based on a second SCR region performance during a second condition, the first condition different than the second condition; and
    oxidizing at least a portion of reductant slipped from the first SCR region at an oxidation catalyst positioned downstream of the first SCR region and upstream of the second SCR region.

7. A method for diagnosing a first SCR region and a second SCR region positioned in series based on a signal from a sensor positioned downstream of the second SCR region, the method comprising:
    when a temperature of the first SCR region is above a high threshold:
        setting a diagnostic code of the second SCR region based on a signal indicating a degradation of the second SCR region; and
        setting a diagnostic code of the first SCR region based on a signal indicating there is not degradation of the second SCR region; and
    when a temperature of the second SCR region is below a low threshold and the temperature of the first SCR region is below the high threshold:
        setting a diagnostic code of the first SCR region based on a signal indicating a degradation of the first SCR region; and
        setting a diagnostic code of the second SCR region based on a signal indicating there is not degradation of the first SCR region.

8. The method of claim 7, further comprising controlling the temperature of the first SCR region and the second SCR region.

* * * * *